US009551568B2

(12) United States Patent
Zhou et al.

(10) Patent No.: US 9,551,568 B2
(45) Date of Patent: Jan. 24, 2017

(54) PREDICTION OF A FOCAL PLANE WITH PROGRESSIVE THROUGH-FOCUS SCANS

(71) Applicant: DMetrix, Inc., Tucson, AZ (US)

(72) Inventors: Pixuan Zhou, Tucson, AZ (US); Chen Liang, Tucson, AZ (US); Xuemeng Zhang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 262 days.

(21) Appl. No.: 14/488,967

(22) Filed: Sep. 17, 2014

(65) Prior Publication Data

US 2015/0006105 A1    Jan. 1, 2015

Related U.S. Application Data

(63) Continuation-in-part of application No. 13/799,068, filed on Mar. 13, 2013, and a continuation-in-part of application No. 14/031,340, filed on Sep. 19, 2013, now Pat. No. 9,323,038, which is a continuation-in-part of application No. 13/799,068, filed on Mar. 13, 2013, said application No. 14/031,340 is a continuation-in-part of application No. 13/803,936, filed on Mar. 14, 2013, now Pat. No. 9,030,548.

(60) Provisional application No. 61/611,544, filed on Mar. 15, 2012, provisional application No. 61/719,432, filed on Oct. 28, 2012, provisional application No. 61/611,544, filed on Mar. 15, 2012.

(51) Int. Cl.
| H04N 7/18 | (2006.01) |
| H04N 9/47 | (2006.01) |
| G01B 11/14 | (2006.01) |
| G02B 21/26 | (2006.01) |
| G02B 21/24 | (2006.01) |
| G02B 21/00 | (2006.01) |
| G02B 21/36 | (2006.01) |

(52) U.S. Cl.
CPC ............ *G01B 11/14* (2013.01); *G02B 21/241* (2013.01); *G02B 21/26* (2013.01); *G02B 21/002* (2013.01); *G02B 21/367* (2013.01)

(58) Field of Classification Search
CPC ............................ G02B 21/365; G02B 21/367
See application file for complete search history.

(56) References Cited

U.S. PATENT DOCUMENTS

| 2004/0223632 | A1* | 11/2004 | Olszak | G02B 21/244 |
| | | | | 382/128 |
| 2006/0192969 | A1* | 8/2006 | Marks | G01J 3/4412 |
| | | | | 356/451 |
| 2012/0220022 | A1* | 8/2012 | Ehrlich | G01N 15/14 |
| | | | | 435/286.2 |
| 2013/0242384 | A1* | 9/2013 | Zhou | G02B 21/26 |
| | | | | 359/382 |

* cited by examiner

*Primary Examiner* — Chikaodili E Anyikire
(74) *Attorney, Agent, or Firm* — Yakov Sidorin; Quarles & Brady LLP (57) ABSTRACT

A method for operating a scanning microscope system. The optimal number of required through-focus scans, that is required to predict the position of a focal plane of the objective with respect to the object to produce the image with minimized blur, is not pre-determined but rather defined iteratively in real-time, contemporaneously with conducting the sample scanning operation itself.

2 Claims, 4 Drawing Sheets

PREDICTION OF A FOCAL PLANE WITH PROGRESSIVE THROUGH-FOCUS SCANS

CROSS-REFERENCE TO RELATED APPLICATIONS

The present application is a continuation-in-part of the U.S. patent application Ser. No. 13/799,068 filed on Mar. 13, 2013, now published as US 2013/0242384, which claims priority from the provisional application No. 61/611,544 filed on Mar. 15, 2012. The present application is also a continuation-in-part of the U.S. patent application Ser. No. 14/031,340, filed on Sep. 19, 2013, now published as US 2014/0118527, which in turn claims priority from the provisional application No. 61/719,432 filed on Oct. 28, 2012. The application Ser. No. 14/031,340 is also a continuation-in-part of each of (a) the U.S. patent application Ser. No. 13/799,068 filed on Mar. 13, 2013, which claims priority from the provisional application No. 61/611,544 filed on Mar. 15, 2012; and (b) the U.S. patent application Ser. No. 13/803,936, filed on Mar. 14, 2013. The disclosure of each of the abovementioned patent documents is incorporated herein by reference.

TECHNICAL FIELD

The present invention relates to imaging of an extensive object with a scanning microscope and, in particular, to system and method of determination and maintaining an optimal position of the focus plane with respect to the object that facilitates the formation of an image with minimum blur.

BACKGROUND

Given that an object imaged with the use of a scanning microscope tool is rarely uniform in thickness, determining the best-focus imaging condition across a large area of the object remains problematic and typically is based on data collected as a result of multiple through-focus scans of the object. The determination of the optimal number of such through-focus scans is a matter of chance in absence of precise information about the thickness distribution of the object across the area being imaged. As a result, both the overall process of imaging remains not optimized and the quality of the procured image of the object suffers, as at least some of the portions of the image are blurred due to less than optimal positioning of the objective with respect to an element of the object being imaged. Accordingly, there remains a need in method and system facilitating an automatic determination of a minimum number of through-focus scans that may be required to predict an optimal position of the focal plane of the objective with respect to the object such that imaging of the entire object produces an image with minimum blur.

SUMMARY

Embodiments of the invention provide an article of manufacture that contains a programmable processor; and a non-transitory tangible computer-readable storage medium having computer-readable program product disposed therein to determine quality of focus of an optical image acquired, with an optical detector from a scanning microscope system, wherein said microscope system is in communication with said article of manufacture, the computer-readable program product containing computer-readable code that, when loaded on a computer, causes the programmable processor to effect processing actions. Among these actions, there is an action of iteratively performing through-focus microscope scans at multiple locations across a region of interest (ROI) of a sample to acquire optical data representing optical images of the sample to determine experimental best-focus positions of an objective of said microscope system at such multiple locations from said optical data. Among these actions, there is also a process of producing a user-perceivable marker indicative of readiness of the system for an imaging process based on comparison of (i) best-focus positions of the objective that have been interpolated, from the experimental best-focus values, for additional locations that are intermediate to said multiple locations, and (ii) experimentally determined best-focus positions of the objective for said additional locations.

Embodiments of the present invention provide a method for determining a best-focus condition for imaging of a sample with a scanning microscope system. The method includes iteratively performing (through-focus microscope scans) at multiple locations across a region of interest (ROI) of the sample to determine experimental best-focus values at said multiple locations from collected optical data. The method additionally includes producing a user-perceivable marker indicative of readiness of the system for an imaging process based on comparison of (i) best-focus values interpolated from said experimental best-focus values for additional locations, which are intermediate to said multiple locations, and (ii) experimentally best-focus values for said additional locations.

In a specific embodiment, the step of producing may include producing a marker in response to a determination, performed with a computer device, that a difference between (i) a best-focus value for an additional location determined through a measurement and (ii) an interpolated best-focus value for said additional location, that has been determined by interpolation, is less than or equal to a depth of focus of an objective of said system. The step of iteratively performing may include performing the through-focus microscope scans until a distance between (a) an experimental best-focus value for a particular location from the multiple locations and (b) a best-focus value for the particular location, as determined through interpolation of experimental best focus values corresponding to neighboring locations from the multiple locations, falls within a depth of focus of an objective of the system.

Alternatively or in addition, the method may contain a step of creating a map of best-focus values for the ROI, where such map includes (i) experimental best-focus values for multiple locations and (ii) best focus values that have been determined, at additional locations intermediate to the multiple locations, by interpolation of said experimental best focus values and the deviation of which from experimental best-focus values at the additional locations is no greater than a depth of focus of an objective of the system.

Embodiments of the invention additionally include a method for determining a best-focus condition for imaging of a sample with a scanning microscope system. The method includes step a) acquiring, with an optical detector of said scanning microscope system, optical data from through-focus scans performed at at least three initial transverse locations at a target area of the sample, wherein such optical data represents positions of best-focus points that have been determined from the initial through-focus scans in coordination with respectively corresponding at least three initial transverse locations. The method also includes step b) of forming a focus map for the target area, with a computer processor, with focus map containing i) the acquired optical data and ii) current extrapolated data, which represent best-focus points extrapolated for transverse locations of the target area from the optical data, in coordination with respectively corresponding transverse locations for the target area. The method additionally includes step c) of acquiring, from additional through-focus scans of the sample, updated optical data representing positions of additional best-focus points in coordination with respectively corresponding transverse locations for the target area, where such additional through-focus scans having been performed at one or more verification points at the target area. Additionally, the method includes step d) computing values of difference(s) between (i) axial positions of said additional best-focus points that correspond to transverse locations of said one or more verification points, and (ii) axial positions of best-focus points, from said current extrapolated data, that correspond to transverse locations of said one or more verification points.

Furthermore, the embodiments of the method includes (when a difference value from the values of difference(s) is larger than a depth of focus of an objective of the scanning microscope system) forming experimental data containing said updated optical data, and repeating steps (b) through (d). When a difference value from the values of difference(s) is not larger than a depth of focus of said objective, the method additionally includes a step of producing an output representing readiness of the scanning microscope system for imaging of at sample under the best-focus condition.

BRIEF DESCRIPTION OF DRAWINGS

The following Detailed Description is presented in connection with generally-not-to scale Drawings, of which.

DETAILED DESCRIPTION

Creation of a high-resolution of an object (such as a section of tissue that has been disposed on a glass slide, for example) using a microscope tool involves several practical consideration. One of the considerations relates to the numerical aperture (NA) of the microscope lens or objective. To form a high-contrast, in-focus image, the object should reside within the depth of focus of the objective during the imaging process, otherwise the resulting image will be out of focus and blurred. As the depth of focus of is reciprocally proportional to the power of its NA $$\text{Depth of Focus} = \frac{\text{Wavelength} * n}{NA^2}, \quad (1)$$

an objective with higher NA has a smaller depth of focus. Consequently, when the object is imaged with a microscope objective having a high NA, the working distance between such objective and the object has to be controlled with higher precision than in the case when imaging is carried out with an objective having a small NA.

Another consideration is raised by the size of the object to be imaged. When the object's area of interest substantially fits within one field of view (FOV) of the utilized microscope objective, controlling the working distance and finding the best focus is relatively straightforward. Such control and determination are achieved by translating the microscope objective axially (along a line that is substantially perpendicular to a surface of the object—a direction referred to, for the purposes of this disclosure as the z-direction) over a sufficient range of travel such that the front focal plane of the objective remains within that range. This process is known as a "through-focus scan". During the through-focus scan, when the object's element is at the correct front focal plane, sharpness of the resulting image is maximized. In comparison, when the object is large such that its area to be imaged expands many FOVs (in practice of imaging of a tissue on the slide—sometimes hundreds or even thousands of FOVs), the scanning of the microscope objective with respect to the object is required. When scanning is involved, however, the process of finding good focus and maintaining an ever-changing portion of the objects in focus becomes complicated, because in practice the imaged object is rarely flat and uniform in thickness. Indeed, not only a typical glass harness used for keeping the tissue in the microscope (that is, both the glass substrate or slide and the cover glass) exhibits thickness variations, but tissue sections that correspond to different scanning positions can and typically do also vary in thickness.

A common method used during the exploitation of scanning microscope systems to find and maintain focus when imaging a large tissue section is to perform through-focus scans at multiple locations corresponding to the same tissue section being imaged. The through-focus scans allow the user and/or the system to determine the best focus position (with respect to the z-direction or axis) at each of such locations. Based on the set of best focus positions at these multiple locations, the best focus positions at any other location on the tissue section is then determined by extrapolation. In most cases, a process of linear extrapolation is used. It is understood that, depending on variations of the thickness of the slide (both the magnitudes and spatial frequenc(ies) of such variations), there should exist some optimal minimum number of through-focus scans that has to be performed to accurately predict the best focus position for the rest of the object. At the same time, neither such optimal number of through-scans nor optimal locations to perform such scans be determined a priori without prior knowledge of the precise geometry and structure of the glass harness. As a result, often time the number and locations of though-focus scan event are determined only based on past experience of the user. The insufficient, lower than optimal number of through-focus scans leads to poor focusing and an image blur at some areas in the image. When the through-focus scan is repeated an excessive number of time, both operational and data processing time and efforts are wasted. Therefore, it is desirable to have a method and system that can intelligently and automatically determine a minimum number of through-focus scans that may be required to predict an optimal position of the focal plane of the objective with respect to the tissue such that imaging the entire tissue section produces an image with minimum blur.

The idea of the present invention stems from the realization that an optimal number of required through-focus scans, that is required to predict the position of a focal plane of the objective with respect to the object to produce the image with minimized blur, does not have to be pre-determined but rather can be determined in iteratively in real-time, contemporaneously with conducting the scanning operation.

According to an embodiment, through-focus scan is initially carried out at a number of locations (referred to as initial through-focus points) positions of which are determined based on knowledge of approximate size and shape of the tissue section that is subject to imaging with a scanning microscope system. Both the approximate size and shape of the tissue are determined readily without performing complicated measurements. Data collected as a result of each of the initial through-focus scans are further analyzed to construct a focus map of the tissue section and to perform additional, so-called verification through-focus scans in order to verify the accuracy and/or quality of the focus map and to make a determination of whether additional iterations of through-focus scan events are required for better assessment of the working position of the focal plane of the microscope objective with respect to the tissue and, if such additional through-focus scans are required indeed, to define the locations of points across the tissue section to perform such additional. Further, once these additional set through-focus scans are performed, the next generation of data is collected that are refined and more precise in comparison with the previous generation of data and facilitates the formation of the next generation of the focus map and yet another determination whether yet additional through-focus scans are required. This iterative process continues on until a predetermined condition or figure of merit (FOM) has been realized. Such FOM is chosen to represent the correlation between the predicted focus map, derived as a result of at least one generation of through-focus scans through the tissue, and the actual "surface of best focus" (a multiplicity of points each of which represents a location of the best focus for imaging the tissue at specific transverse coordinates) determined by the parameters of the glass harness and location of the scanning objective with respect to the glass harness.

The problem of determining an optimal number of through-focus scans for the operation of a scanning microscope tool is solved by performing progressive iterations of through-focus scans of the object and constructing a focus map representing optimal working (axial) distances, at which the objective is positioned with respect to the tissue as a function of the transverse coordinates across the tissue based on information about the object and glass harness. Data representing the section of the imaged tissue gained from each such iteration is used to aid the focus map prediction for the next iteration of through-focus scans.

Figures 1A, 1B:
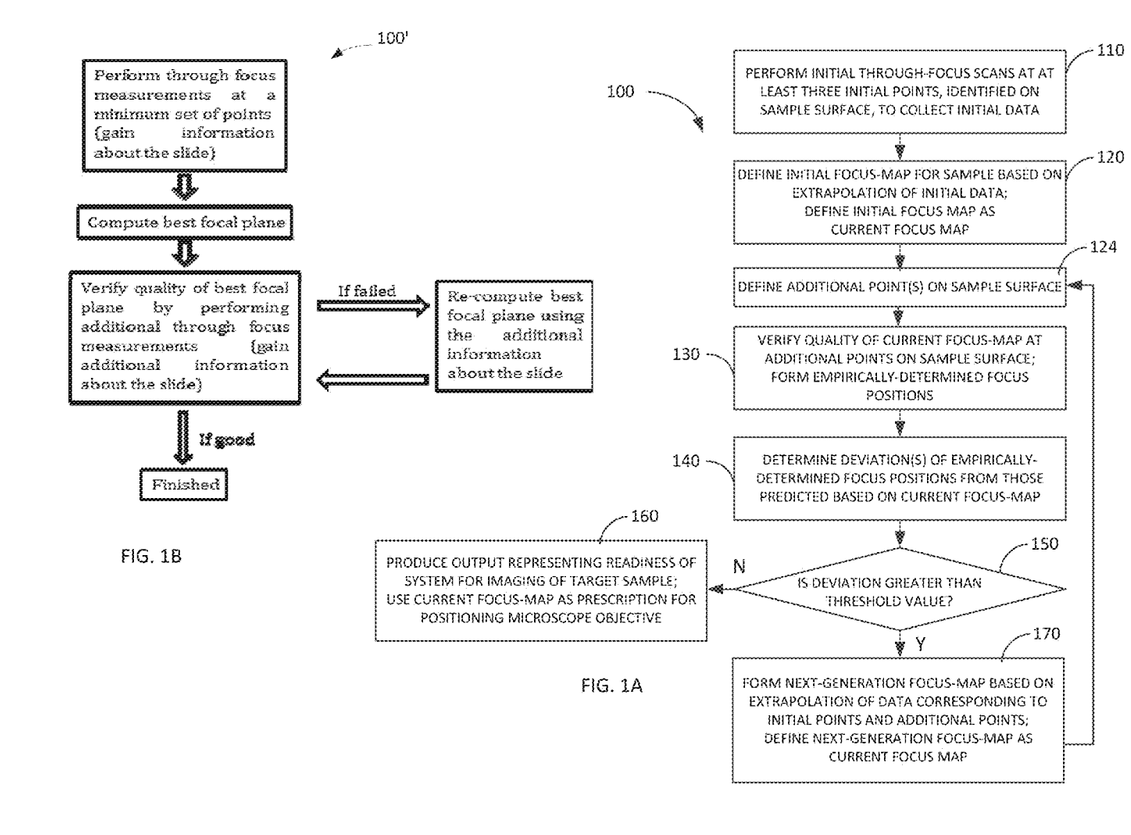
FIG. 1A is a flow-chart representing an embodiment of a progressive through-focus scan method for determining best-focus positions of the objective.
FIG. 1B is a simplified flow-chart of the method of the invention.

Example of an embodiment is further described in reference to FIG. 1 and in further reference to FIGS. 2A, 2B, 2C, 2D, 2E in which, for simplicity of illustration, only a two-dimensional cross-section of the object 210 is shown (as defined along the z-axis) Notwithstanding, it is appreciated that the scope of the invention encompasses a three-dimensional methodology.

As shown in FIG. 2A, the arbitrarily shaped slice of the tissue sample 210 is fixed between a glass substrate 218 and a cover glass 214, the variation of the thickness of each of which is generally unknown. As elements of FIG. 2A are not to scale, the thickness variations are exaggerated for demonstration purposes. The initial through-focus measurements are chosen to be performed, at step 110, at at least three initial through-focus points: as shown, three points A, B, and C. This initial set of through-focus points represents a minimum set of points determined based on the size of the tissue sample 210 and commonly-known parameters of typical microscope slides.

Data collected as a result of such first generation, initial through-focus measurements (specifically, data representing such axial positions 230, 234, 238 of a focal plane of the objective that correspond to images with optimal quality taken of the object at the locations A, B, and C) are used at step 120 to determine by extrapolating a first-generation, initial best focus map for the whole slide. (The extrapolation may be based on linear extrapolation, cubic extrapolation, or other high-order polynomial extrapolation.) An example of a linearly-extrapolated focus map is schematically shown as 240 in FIG. 2B. It contains a prescription for axial positions of the objective, at points across the sample 210, at which the image of the sample should be taken at such points in order to reduce the amount of image blur to the first approximation.

The quality of the so-formed first-generation focus map is then verified by performing, at step 130, a second-generation, verification through-focus scans at different additional points (denoted arbitrarily as X and Y and chosen at step 120), to empirically determine best-focus positions 244, 248 for imaging of the sample 210 at points X and Y. If differences, 140, between the measured best-focus z-positions and respective position that has been predicted, based on the initial focus map, are determined at step 150 for points X and Y to be small (for example, smaller than a pre-determined threshold value), then the system generates, as step 160, a corresponding output signifying that the initial best focus map is sufficient for imaging of this section of the tissue. As shown in FIG. 2C, this is the case only for the best-focus map value corresponding to point Y, where the difference 261 between the value predicted based on the map 240 and the experimentally determined value 248 is below the chosen threshold value. However, if a differences, 140, between the corresponding empirical and predicted z-positions is large at at least one of the additional points (which is the case for point X, as shown by the z-gap 260), then z-positions that have been so far empirically-determined using through-focus scans for all points across the sample 210 (as shown, for points A,B,C, X, and Y) are further used to re-extrapolate, at step 170, the map of the best focus to form a second-generation map 270, shown in FIG. 2D.

The quality of so re-extrapolated the best focal plane 270 of the second generation is again verified by performing third-generation verification through-focus scans over those areas of the sample 210 that produced a poor match between the predicted and empirical valued during the preceding iteration. In the example of FIG. 2C, the third-generation verification through focus scans are performed at points J and K located in the area of the sample between points A and B.

The resulting empirical values for best-focus z-positions of the objective corresponding to imaging of the sample 210 at points J and K are denoted as 274, 278 in FIG. 2E. FIG. 2E also shows the third-generation focus-map 280 that can be formed (if required based on comparison between the values 274, 278 with the values predicted based on map 270) as a result of yet another map-extrapolation. According to an embodiment, this iterative process progressively continues until all values of z-positions empirically obtained at measurement points used during a through-focus scan of a particular generation match the corresponding predicted values (determined based on a focus map of the previous generation) within the predetermined threshold. When such predetermined threshold for the acceptable difference between the focus-map-based predicted value and the experimentally-determined value is chosen based on the depth of focus of the objective of the scanning microscope and geometry of the object (tissue section), the given focus map provides a recipe for a substantially blur-fee imaging of the sample 210.

Selecting Initial Best-Focus Points

Figure 2:
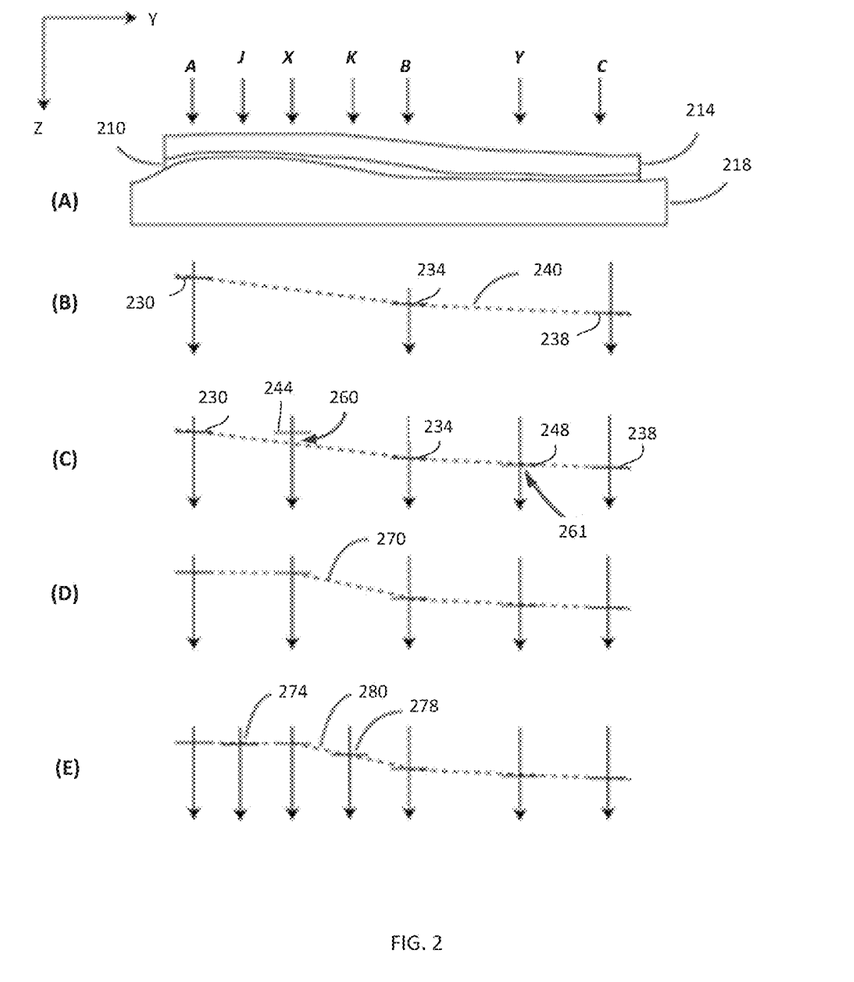
FIGS. 2A, 2B, 2C, 2D, 2E provide additional illustrations to extrapolation of focus maps based on through-focus scans performed at target points on sample surface.

The number of and lateral positions for the initial through-focus scans (such as, for example, the initial through-focus scans discussed in reference to points A, B, and C of FIG. 2) depend on the size and shape of the sample and can be determined by a variety of methods. Any additional information that is available a priori about the section of the sample facilitates better selection of operational characteristics of the initial through-focus measurements. In one example shown in FIG. 3A and representing the simplest scenario, the initial through-focus scans may be be carried out at three points A, B, C that are identified near the boundary 320 of the sample section 310 of the sample such that these points forms a triangle the area of which is the largest available based on the boundary 320. Alternatively, a set of multiple points exceeding three points may be chosen such that the area enclosed by a polygon defined by these points includes a continuous area of the sample section 310 and is maximized within the boundary 320. The latter approach may be advantageous in the case of a complex- and arbitrarily-shaped boundary 320. In such general case, sample one triangle defined by the points A, B, C may not cover sufficient area of the sample section 310, and the non-triangular polygon may be defined by adding more initial points (points D, E, F in FIG. 3B) such as to form multiple triangles the aggregate area of which is no smaller than the threshold area. One possible criterion for such threshold (minimum) total area inscribed within the polygon can be set by a ratio $R_0$:

$$Ro = \frac{\text{Area of tissue section inside all of the triangles}}{\text{Total area of the tissue section}} \quad (2)$$

Figure 3A:
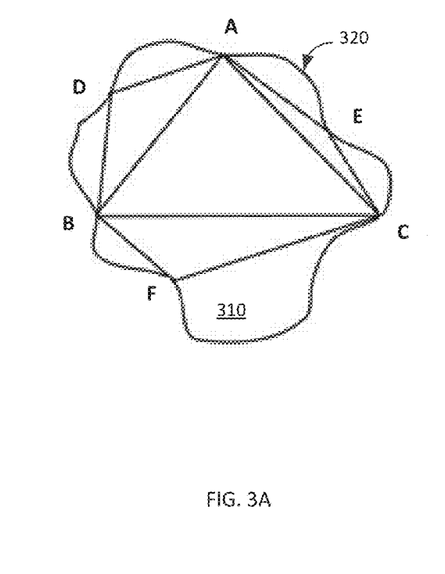
FIGS. 3A and 3B provide a top view of an arbitrarily shaped section of the sample and illustrated the choice of positioning of target points on sample surface.
Figure 4:
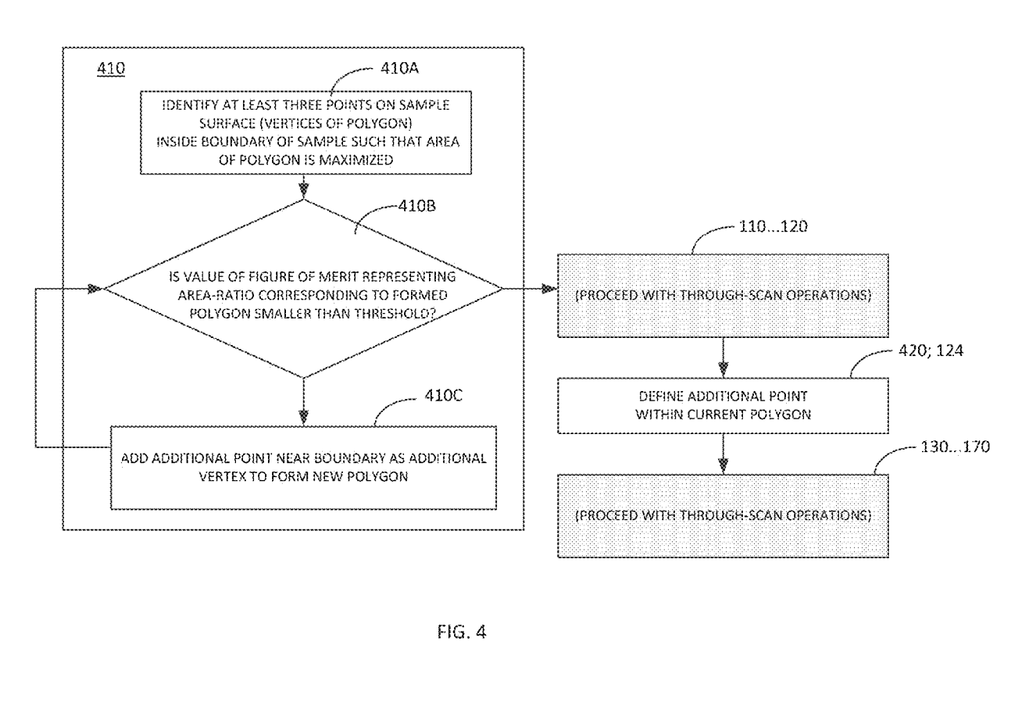
FIG. 4 is a flow-chart of an embodiment of a method according to which the target points of FIGS. 3A, 3B can be chosen.

An embodiment of methodology of determining positions, across the sample being measured, for initial through-focus scans is illustrated in reference to FIG. 4. Here, at step 410 those points are defined that form the initial set of points for performing the initial though-focus scans. These at least three initial points are defined, at 410A, near the pre-determined boundary of the tissue section such as to maximize the area enclosed in a triangle formed by these points. The corresponding value of the ratio $R_0$ is then compared at step 410B with the predetermined minimum value $R_{min}$. If $R_0 < R_{min}$, then an additional point is chosen, at step 410C, near the boundary of the tissue section outside to the initial polygon (initial triangle) such as to form vertices of a new polygon defined by lines sequentially connecting all these points. The ratio $R_0$ representing the area of so-formed new polygon is further compared with the threshold ratio $R_{min}$. Such process of adding new vertices to form new polygons that are bound by the boundary Z20 is continued until the ratio $R_0$ reaches the minimum value $R_{min}$, at which point the set of initial points is formed. As illustrated in the example of FIG. 3A, the set of initial points chosen according to the methodology of FIG. 4 includes points A, B, C (if the area of the triangle ABC satisfies the threshold condition). FIG. 3A also simultaneously illustrates an alternative situation, when the initial set of point includes points A, B, C, D, E, and F (the area of the polygon ABCDEF satisfies the threshold condition above).

Verifying Selected Best-Focus Points

Once the initial, first-set points have been chosen, the initial focus-scans have been performed, and the initial (first-generation) focus-map has been formed (compare with FIGS. 1, 2B), position(s) of the verification point(s) is further determined at step 420, at which verification of the first generation focus-map can be performed, according to the embodiment 100 of the process of FIG. 1. Such verification point(s) may be chosen, for example, as geometric center(s) of the triangle(s) defined by the initial through-focus points.

Figure 3B:
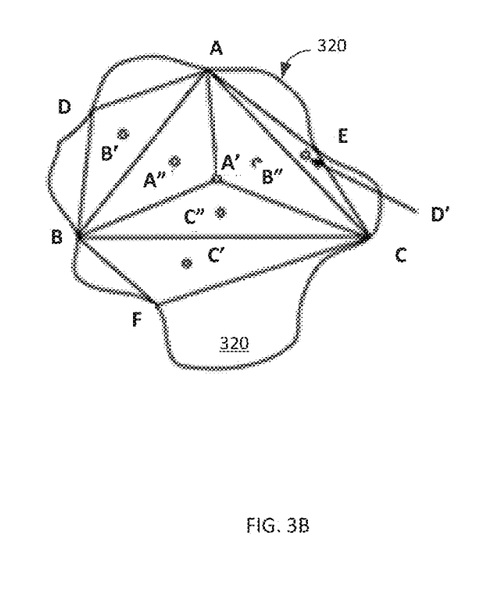

For example, for the tissue section 310 of FIGS. 3A, 3B the point for the verifying through-focus scan can be chosen to be point A' for the triangle ABC. The best focus position along the z-axis measured at A' is then compared to the extrapolated value (as discussed in reference to FIGS. 1 and 2A-2E) to determine the quality of the initial focus map. If the matching condition of step 150 of FIG. 1 has not been met (e.g. the axial separation between the best focus location predicted based on the focus map and that empirically determined based on the immediate verification through-focus scan is larger than the depth of focus of the objective), then yet another (next-generation) set of additional points is formed. For example, triangle ABC of FIG. 3B is divided into three child-triangles: triangle ABA' (ΔABA'), triangle ACA' (ΔACA'), and triangle BCA' (ΔBCA'). The focus map is then re-extrapolated as discussed above using the new through-focus data; additional verification through-focus scans can be taken be taken at points A", B" and C" that are also defined as geometrical centers of corresponding triangles forming the polygon of the example of FIG. 3B.

Determining the Shape of the Tissue

In order to implement the progressive through-focus scan measurements according to embodiments discussed above, the approximate shape and size of the object (tissue section) should be known. The information about the shape can be obtained with a low-resolution image acquired with a secondary imaging system that is mounted onto the frame of the scanning microscope tool separately from the main microscope objective. Such secondary imaging system can be a small camera module such as, for example, a camera module employed in a mobile phone, to afford acquisition of the low-resolution image in one snap-shot.

Alternatively, a low-resolution image of the object can be obtained in a pre-through-focus-measurement step with a low-magnification objective such as a 1X -objective initially installed in place of the main microscope objective. In this case, a pre-through-focus-measurement scanning the object may be required to capture the image of the entire area of the tissue section in question. The depth of focus for such low magnification objective is typically very large (up to hundreds of micrometers), and the optimal position of the focal plane can be easily estimated based on mechanical features of the slide. For example, mechanical gauges or optical sensors can be used to measure the axial location (in axial direction) of the top surface of the glass substrate or the top surface of the cover glass relative to a low-magnification objective. The axial location of the tissue section can then be assessed based on assumption of a typical thickness of commercially-available cover glass (for example, approximately 150 microns).

Additional Considerations

The travel range of the microscope tool in the axial (z-) direction of the initial through-focus scan needs to be sufficiently large, to compensate for initially-insufficient knowledge of mutual positioning of the tissue sample relative to the microscope objective and to endure that the initial position of the best focus plane is experimentally determined within such travel range. Depending on the type of object to be imaged and for a typical glass slide used in pathology research, the travel range for the initial through-focus scan may be in the range of several hundreds of micrometer to compensate the uncertainty in parameters such as axial location of the top surface of the glass substrate, thickness of the tissue section, and thickness of the cover glass. In comparison, the travel range for a verification through-focus scan (at any level or generation of data acquisition) can be smaller and limited based on the approximate, initial positioning of the best focal surface along the axial direction has been already determined based on the initial, first generation through-focus scan. For through-focus scans the travel range only need to be large enough to compensate variations between initial through-focus points (which are typically small, on the order of tens of micrometers) By using a shorter travel range for verification through-focus scans, the time necessary to progressively determine a map of best focal positions at a minimum number of points across the sample can be shortened to optimize the process of the invention. With each progressive generation, the axial separation between the empirically-determined best-focus points and those assessed theoretically (extrapolated) progressively reduces. Accordingly, the axial travel range of a microscope objective for through-focus scans also reduces from iteration to iteration of progressive focus prediction process.

In practice, the initial through-focus scan measurement of a small-sized tissue section 210, the area of which is on the order of only a few FOVs of the microscope objective, can be reduced to a single measurement carried out at a point of or near the center of the tissue section.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, when the present disclosure describes features of the invention with reference to corresponding drawings (in which like numbers represent the same or similar elements, wherever possible), the depicted structural elements are generally not to scale, and certain components are enlarged relative to the other components for purposes of emphasis and understanding. The invention as recited in claims appended to this disclosure is intended to be assessed in light of the disclosure as a whole, including features disclosed in prior art to which reference is made.

Disclosed aspects, or portions of these aspects, may be combined in ways not listed above. In view of the numerous possible embodiments to which the principles of the disclosed invention may be applied, the invention should not be viewed as being limited to the disclosed example. For example, embodiments of the present invention can be practices with any of the optical systems and methods discussed in co-assigned patent applications Ser. Nos. 13/799,068; 13/803,936; 13/861,121; and 14/031,340. The disclosure of each of these patent applications is incorporated by reference in its entirety.

The present invention may be embodied in different forms such as a system, method, or computer program product. For example, those skilled in the art should readily appreciate that functions, operations, decisions, etc. of all or a portion of a method of the invention may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (for example, floppy disks, removable flash memory and hard drives) or information conveyed to a computer through communication media, including wired or wireless computer networks.

In addition, while the invention may be embodied in software, the functions necessary to implement the invention may optionally or alternatively be embodied in part or in whole using firmware and/or hardware components (such as combinatorial logic, Application Specific Integrated Circuits or ASICs, Field-Programmable Gate Arrays or FPGAs, or other hardware or some combination of hardware, software and/or firmware components), and may include an specific electronic circuitry or a processor controlled by instructions stored in a tangible, non-transient memory medium. The computer-usable or computer-readable medium may be, for example, an electronic, magnetic, optical, electromagnetic, infrared, or semiconductor system, apparatus, device, or propagation medium. For example, computer-usable or computer-readable medium may include a tangible non-transitory storage medium, such as, without limitation, a random access memory (RAM), a read-only memory (ROM), an erasable programmable read-only memory (EPROM or Flash memory), a compact disc read-only memory (CDROM), and/or an optical storage memory medium, or any other memory, or combination thereof, suitable for storing control software or other instructions and data. The computer-usable or computer-readable medium may comprise and/or be complemented with an apparatus that contains, stores, communicates, propagates, or transports program code for use by or in connection with the instruction execution system, apparatus, or device. The computer program product may comprise program code stored in a computer readable medium that, when executed on a computing device, causes the computing device to perform and/or govern one or more of the processes described herein. The computer program product can be written in any conventional programming language (such as, in one example, C++) or the like.

What is claimed is:

1. A method for determining a best-focus condition for imaging of a sample with a scanning microscope system, the method comprising:

a) with an optical detector of said scanning microscope system, acquiring optical data from through-focus scans performed at at least three initial transverse locations at a target area of the sample, said optical data representing positions, of best-focus points, that have been determined from said initial through-focus scans in coordination with the at least three initial transverse locations, respectively;

b) forming a focus map for the target area, with a computer processor, said focus map containing:
   i) said optical data and
   ii) current extrapolated data, which represent best-focus points extrapolated for transverse locations of the target area from said optical data, in coordination with respectively corresponding transverse locations for the target area;
c) acquiring, from additional through-focus scans of the sample, updated optical data representing positions of additional best-focus points in coordination with respectively corresponding transverse locations for the target area, said additional through-focus scans having been performed at one or more verification points at the target area;
d) computing difference values between
   (i) axial positions of said additional best-focus points that correspond to transverse locations of said one or more verification points, and
   (ii) axial positions of best-focus points, from said current extrapolated data, that correspond to transverse locations of said one or more verification points;
e) when a difference value from said difference values is larger than a depth of focus of an objective of said scanning microscope system, forming experimental data containing said updated optical data, and repeating steps (b) through (d).

2. A method according to claim 1, further comprising:
   f) when a difference value from said difference values is not larger than a depth of focus of said objective, producing an output representing readiness of the scanning microscope system for imaging of said sample at the best-focus condition.

* * * * *